United States Patent [19]
Taguchi et al.

[11] Patent Number: 5,565,950
[45] Date of Patent: Oct. 15, 1996

[54] VIEW FINDER

[75] Inventors: Ichiro Taguchi; Masahiro Inazuka, both of Tokyo, Japan

[73] Assignee: Asahi Kogaku Kogyo Kabushiki Kaisha, Tokyo, Japan

[21] Appl. No.: 377,363

[22] Filed: Jan. 24, 1995

[30] Foreign Application Priority Data

Jan. 25, 1994 [JP] Japan ............... 6-000193 U

[51] Int. Cl.$^6$ ............... G03B 13/08
[52] U.S. Cl. ............... 396/386; 396/373
[58] Field of Search ............... 354/155, 224, 354/225, 288

[56] References Cited

U.S. PATENT DOCUMENTS 4,164,369  8/1979  Urano et al. .
4,209,247  6/1980  Urano et al. .
4,974,014  11/1990  Teramoto et al. .
4,999,658  3/1991  Kamitani et al. .
5,041,854  8/1991  Kirigaya .
5,130,855  7/1992  Mukai et al. .
5,250,969  10/1993  Abe et al. .
5,323,264  6/1994  Kato .

*Primary Examiner*—David M. Gray
*Attorney, Agent, or Firm*—Greenblum & Bernstein P.L.C.

[57] ABSTRACT

A view finder includes a finder body which defines an optical path of the view finder and optical elements, including a roof mirror are provided along the optical path. The finder body has an opening for the roof mirror, so that the roof mirror is secured to the opening such that an outer portion of the roof mirror projects out of the finder body through the opening.

8 Claims, 3 Drawing Sheets

VIEW FINDER

BACKGROUND OF THE INVENTION

1. Field of the Invention

The present invention relates to a sealed view finder in which an optical path of a finder optical system is partly or entirely closed.

2. Description of the Related Art

In a real image type view finder to be incorporated in a lens shutter type camera, etc., an optical element, such as a condenser lens is provided on a focal plane of an objective lens group or in the vicinity thereof, as shown in FIG. 5. In FIG. 5, a Condenser lens 63 is provided with a first surface 63a and a second surface 63b, on or in the vicinity of a focal plane of an objective lens group L1. If foreign matter such as dust contacts to the first or second surface 63a or 63b of the condenser lens 63, the foreign matter which is in the vicinity of the focal plane can be viewed in a focused state on an object image by a photographer. Hence, the foreign matter obstructs the object image.

A solution to this problem is to partially isolate the light path of the finder including optical elements from the surroundings. For instance, a roof mirror 61, the condenser lens 63, a pentagonal prism 67, and an ocular lens L2 are positioned within a sealed finder housing 51 which defines therein a closed optical path having a rectangular shape in a cross section perpendicular to the optical axis. Entrance and emission openings 53 and 54 of the finder housing 51 are closed or sealed by a first glass cover 58 and a second glass cover 59, respectively.

However, in this configuration, the roof mirror 61 is housed in the housing 51, and accordingly, the side wall of the housing 51 is located behind the roof mirror 61. Therefore, there is unused space between the side wall of the housing 51 and the roof mirror 61, as shown in FIG. 5.

SUMMARY OF THE INVENTION

The primary object of the present invention is to provide a sealed view finder in which unused space is eliminated or reduced.

To achieve the object mentioned above, according to the present invention, there is provided a view finder including: a finder body which defines an optical path of the view finder; and optical elements including a roof mirror which are provided along the optical path. The finder body has an opening for the roof mirror, so that the roof mirror is secured to the opening such that an outer portion of the roof mirror projects out of the finder body from the opening.

The present disclosure relates to subject matter contained in Japanese Utility Model Application No. 06-193 (filed on Jan. 25, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
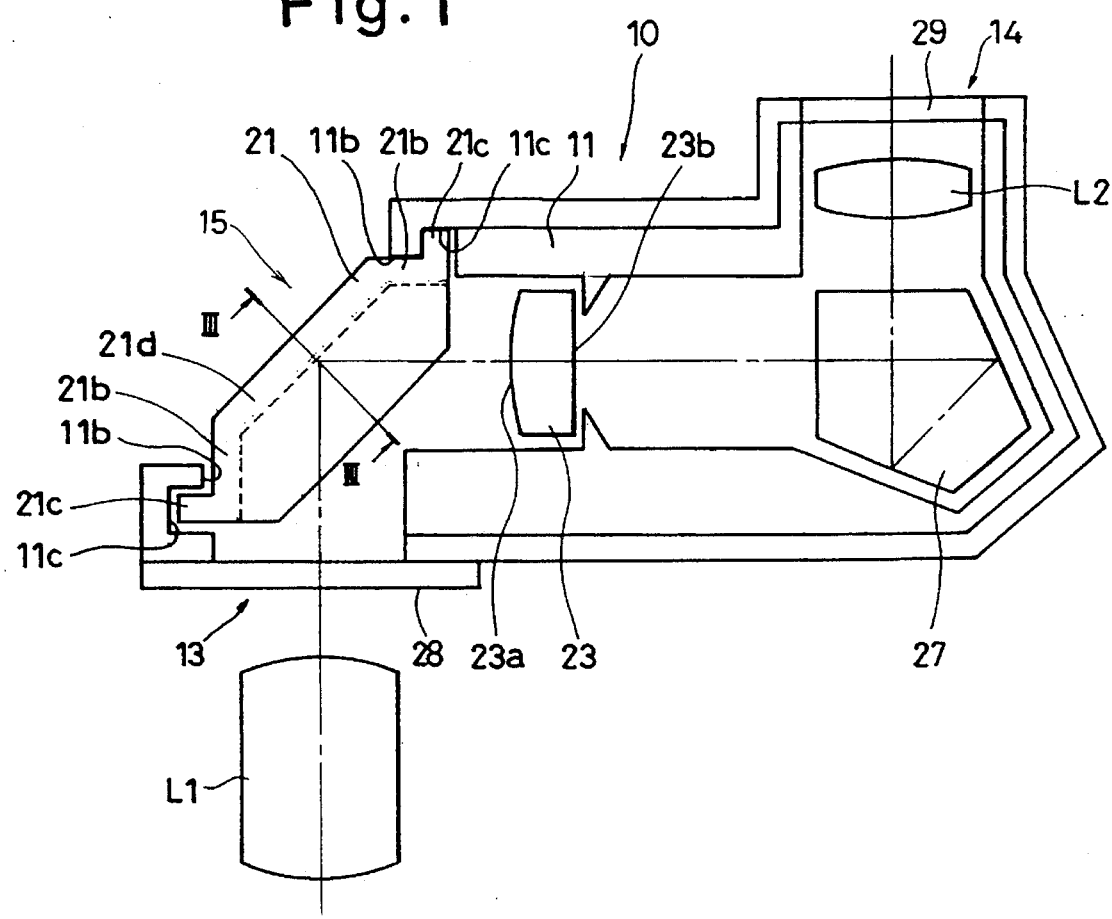
FIG. 1 is a sectional plan view of a real image type zoom finder, taken along an optical axis thereof, according to the present invention.

FIGS. 1 and 2 (2A, 2B) show a real image type of zoom finder with a removed lid, to which the present invention is applied. The real image type zoom finder can be incorporated for example in a lens shutter type camera.

The zoom finder shown in FIG. 1 includes of an objective lens group L1, a roof mirror 21, a condenser lens 23, a pentagonal prism 27, and an ocular lens (eyepiece) L2. Among these optical elements, the roof mirror 21, the condenser lens 23, the pentagonal prism 27, and the eyepiece L2 are positioned within the finder body 10.

The finder body 10 includes a housing 11 and a cover (lid) 12 which is separated from the housing 11 along the optical path of the finder. The housing 11 is generally U-shape in cross section, having upper opening ends. The upper opening end is closed by the cover 12 fitted to the housing 11. The inner surfaces of the housing 11 and the cover 12 define an optical path whose cross sectional shape is rectangular. The housing 11 and the cover 12 are usually made of synthetic resin and are preferably black in color so as to exhibit a low reflectance.

The finder body 10 which includes the housing 11 and the cover 12 has an entrance opening 13 and an emission opening 14. The entrance opening 13 is covered by a glass cover 28 secured thereto to seal the entrance opening 13. The emission opening 14 of the finder body 10 is covered by a glass cover 29 secured thereto to seal the emission opening 14 and protect the eyepiece L2.

In the real image type zoom finder as constructed above, an object image is viewed as follows.

Light rays transmitted through the objective lens group L1 enter the finder body 10 through the glass cover 28. Thereafter, the light rays (object image) entering the finder body 10 are reflected at approximately right angles in a direction (horizontal direction in FIG. 1) perpendicular to the incident direction by a pair of mirror portions 21a of the roof mirror 21, and are gathered by the condenser liens 23. An object image is formed on or in the vicinity of the second surface 23b of the condenser lens 23 by the reflection by the roof mirror 21.

The light rays transmitted through the condenser lens 23 are reflected twice by the pentagonal prism 27 and pass backward in parallel with the optical axis of the objective lens group L1 within the housing. Thereafter, the outgoing light passes through the eyepiece L2 and the glass cover 29 and is emitted outside of the finder body 10. Thus, a photographer can view the erect object image through the glass cover 29 and the eyepiece L2.

Figure 2A:
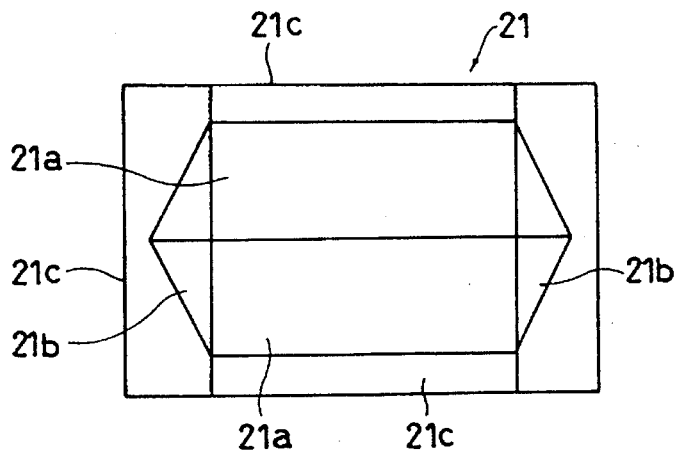
FIGS. 2A and 2B are front and side elevational views of a roof mirror shown in FIG. 1.
Figure 2B:
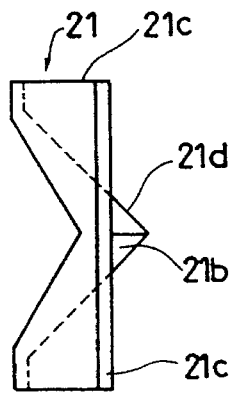
Figure 3:
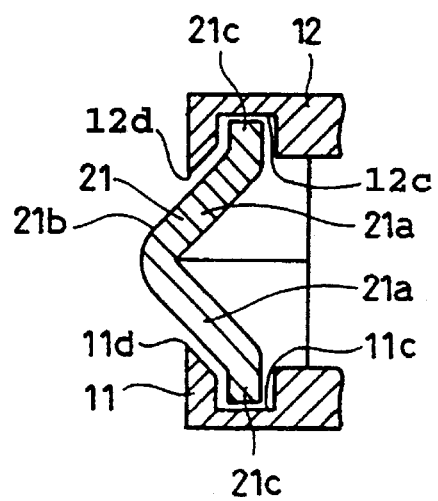
FIG. 3 is a sectional view taken along the line III—III in FIG. 1.
Figure 4:
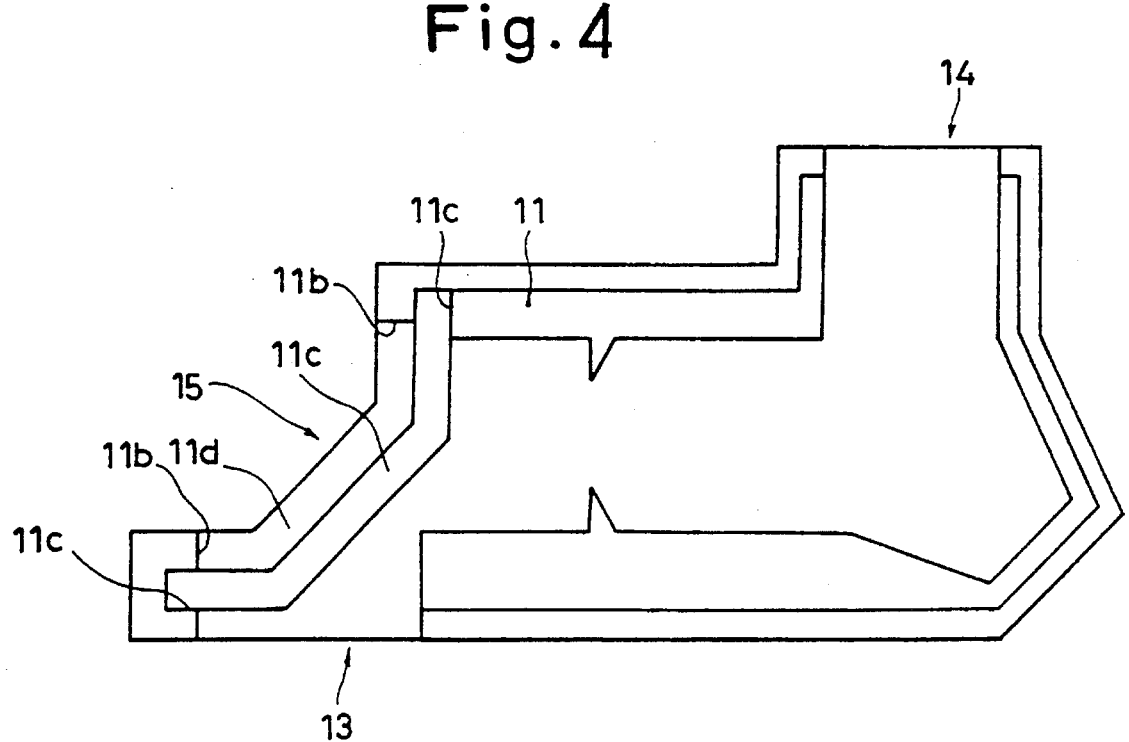
FIG. 4 is a plan view of a finder housing shown in FIG. 1.
Figure 5:
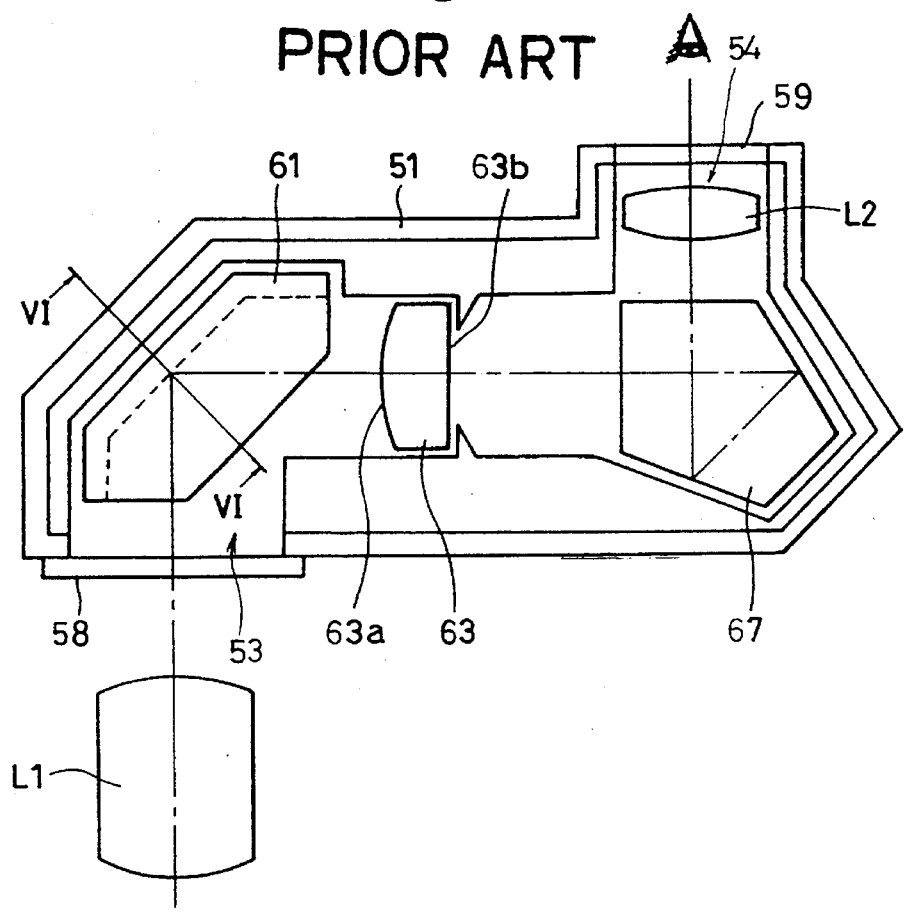
FIG. 5 is a sectional plan view of a known real image type zoom finder.
Figure 6:
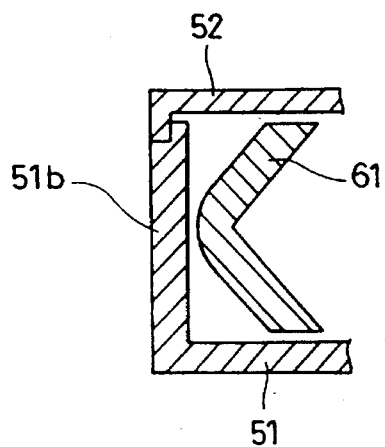
FIG. 6 is a sectional view taken along the line V—VI in FIG. 5.

The main features of the present invention will be discussed below with reference to FIGS. 2 through 4. FIGS. 2A and 2B show a front elevation and a side elevation of the roof mirror 21, respectively. FIG. 3 shows a sectional view taken along the line III—III in FIG. 1, and FIG. 4 is a plan view of the housing 11.

The roof mirror 21 is provided with a pair of orthogonal mirror portions 21a which are interconnected at the opposed ends thereof through connecting/reinforcing portions 21b. The roof mirror 21 is provided, on the open outer edge portions of the mirror portions 21a and the connecting/reinforcing portions 21b, with rib portions 21c integral therewith, extending out of the optical axis.

The housing 11 is provided with an opening 15 in which the roof mirror 21 is held with the outer side portions 21d projecting outward from the finder body 10. The edge portions of the housing 11 and the lid 12 that define the opening 15 are respectively provided with grooves 11c and 12c in which the rib portions 21c can be fitted. The roof mirror 21 is positioned and secured to the finder body 10 through the engagement of the rib portions 21c with the grooves 11c and 12c. The outer side portions 21d of the roof mirror 21 project out of the finder body 10, as mentioned above, so that the roof mirror 21 closes the opening 15.

The housing 11 is provided, on the edge thereof that defines the opening 15, with inclined surfaces 11b along the outer surfaces 21b of the connecting/reinforcing portions 21b of the roof mirror 21. The housing 11 and the lid 12 are respectively provided with inclined surfaces 11d and 12d along the outer side portions 21d of the roof mirror 21. The inclined surfaces 11b, 11d and 12d can be holding surfaces which come into contact witch the roof mirror 21 to hold the latter.

As mentioned above, according to the present invention, the roof mirror 21 is held by the finder body 10 so that the roof mirror 21 is not entirely received within the finder body 10 and the outer side portions 21d of the roof mirror 21 project out of the finder body 10. Accordingly, not only can foreign matter which would otherwise spoil the field of view of the finder be prevented from entering the finder body 10, but also the volume of the finder body 10 can be reduced. Consequently, the space behind the roof mirror 21 can be effectively utilized.

Moreover, since the reflecting surfaces are constituted by the roof surfaces 21a of the roof mirror 21 in the illustrated embodiment, the volume and weight of the finder as a whole can be reduced in comparison with an arrangement in which the reflecting surfaces are constituted by a prism.

Although the roof mirror 21 is provided on the peripheral edge portion thereof, with the projecting rib portions 21c that can be fitted in the grooves 11c and 12c of the housing 11 and the lid 12 in the illustrated embodiment, it is possible to provide grooves on the roof mirror 21 and provide projections on the housing 11 and the lid 12, respectively. The present invention is not limited to the illustrated embodiment.

Although the reflecting optical system is constituted by the roof mirror and the pentagonal prism in the illustrated embodiment, the present invention is not limited thereto. For instance, the roof mirror and the pentagonal prism can be replaced with a roof prism and a pentagonal mirror. It is also possible to use a roof mirror and a pentagonal mirror in combination or a roof prism and a pentagonal prism in combination.

As can be understood from the foregoing, according to the present invention, since a roof mirror is accommodated and held in a finder, with the outer surface portion projecting out of the finder body, the ambient space of the roof mirror can be effectively utilized, while preventing foreign matter from entering the finder body, and hence, a camera in which the view finder is to be incorporated can be made smaller and lighter.

We claim:

1. A real image view finder for use in a lens shutter camera having a photographing optical system and a finder optical system disposed separately from the photographing optical system, said view finder comprising:

a view finder objective lens group;

a view finder body defining an optical path of said view finder between an entrance end and an emission end;

optical elements including a roof mirror, a condenser lens positioned in a vicinity of a focal plane of the view finder objective lens group, a pentaprism and an eyepiece lens, said optical elements provided along the optical path within said view finder body, said roof mirror including orthogonal mirror portions joined at a roof line;

wherein said finder body comprises, intermediate said entrance end and said emission end, an opening for said roof mirror, said roof mirror being positioned in said opening such that an outer portion of said roof mirror, including said roof line, projects out of said view finder body from said opening, whereby said roof mirror closes said opening.

2. The view finder according to claim 1, further comprising transparent covers secured to each said entrance opening and said emission opening to seal said openings and to define a sealed view finder housing and preventing foreign material from entering said optical path of said view finder.

3. The view finder according to claim 1, said roof mirror comprising connecting portions at opposite ends of said roof line for connecting said orthogonal mirror portions to each other and for reinforcing said roof mirror, said roof mirror further comprising rib portions extending from each of said connecting portions and from free ends of each of said orthogonal mirror portions, said view finder body comprising retaining grooves adjacent a periphery of said opening within which said rib portions are received.

4. The view finder according to claim 1, said view finder body further comprising inclined surfaces positioned along peripheral edges of said opening, said inclined surfaces comprising holding surfaces for contacting said roof mirror and holding said mirror to said view finder body.

5. The view finder according to claim 1, said roof mirror comprising rib portions at free ends of said orthogonal mirror portions.

6. A view finder according to claim 1, wherein a peripheral edge of said roof mirror is provided with a rib portion projecting out of said optical path of said view finder.

7. A view finder according to claim 6, wherein said finder body is provided with a groove in which said rib portion of said roof mirror can be fitted.

8. A view finder according to claim 1, wherein said finder body comprises a housing extending along said optical path and a lid secured to said housing.

* * * * *